(12) United States Patent
Iwahara et al.

(10) Patent No.: US 10,808,743 B2
(45) Date of Patent: Oct. 20, 2020

(54) CLIP

(71) Applicant: DAIWA KASEI KOGYO KABUSHIKI KAISHA, Okazaki-shi, Aichi-ken (JP)

(72) Inventors: Toshio Iwahara, Okazaki (JP); Takahiro Sugiyama, Anjo (JP)

(73) Assignee: DAIWA JASEI KOGYO KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/230,583

(22) Filed: Dec. 21, 2018

(65) Prior Publication Data

US 2019/0195262 A1 Jun. 27, 2019

(30) Foreign Application Priority Data

Dec. 27, 2017 (JP) .................. 2017-251773

(51) Int. Cl.
| | |
|---|---|
| *F16B 5/06* | (2006.01) |
| *F16B 21/07* | (2006.01) |
| *F16B 21/08* | (2006.01) |
| *B60R 13/00* | (2006.01) |
| *B60K 37/04* | (2006.01) |

(52) U.S. Cl.
CPC .............. *F16B 21/075* (2013.01); *F16B 5/06* (2013.01); *F16B 5/065* (2013.01); *F16B 21/086* (2013.01); *B60K 37/04* (2013.01); *B60K 2370/80* (2019.05); *B60R 13/005* (2013.01); *Y10T 24/309* (2015.01)

(58) Field of Classification Search
CPC .......... F16B 5/06; F16B 5/065; F16B 21/075; F16B 21/086; B60K 2370/80; B60K 37/04; B60R 13/005; Y10T 24/309
See application file for complete search history.

(56) References Cited

U.S. PATENT DOCUMENTS

| | | | |
|---|---|---|---|
| 2011/0203081 A1* | 8/2011 | Iwahara ................. | F16B 5/065 24/458 |
| 2011/0314642 A1* | 12/2011 | Diez Herrera ......... | B60N 3/026 24/293 |

(Continued)

FOREIGN PATENT DOCUMENTS

| | | |
|---|---|---|
| JP | 2009-275869 A | 11/2009 |
| JP | 2017-145860 A | 8/2017 |

*Primary Examiner* — Robert Sandy
*Assistant Examiner* — Michael S Lee
(74) *Attorney, Agent, or Firm* — Christensen, Fonder, Dardi & Herbert PLLC

(57) ABSTRACT

A clip main body of a clip may include a head portion, a pair of inner legs continuous with the head portion, and a pair of elastically deformable outer legs respectively continuous with distal end portions of the inner legs. The outer legs are configured such that when an extraction force is applied to the clip main body in an attached condition in which the clip main body connected to a coupling rib of an attachment base is inserted into and held in an attaching hole of an object member while pressing portions formed in distal end portions of the outer legs are respectively pressed to bearing surfaces formed in a bearing member, the pressing portions of the outer legs are respectively disengaged from the bearing surfaces of the bearing member before most-bulged portions formed in the outer legs pass through a rear surface-side periphery of the attaching hole.

6 Claims, 16 Drawing Sheets

(56) References Cited

U.S. PATENT DOCUMENTS

| | | | |
|---|---|---|---|
| 2012/0305724 A1* | 12/2012 | Diez Herrera | B60N 3/026 |
| | | | 248/231.81 |
| 2013/0199003 A1* | 8/2013 | Iwahara | F16B 2/22 |
| | | | 24/530 |
| 2014/0000071 A1* | 1/2014 | Choi | F16B 5/0657 |
| | | | 24/543 |
| 2014/0363224 A1* | 12/2014 | Iwahara | F16B 5/065 |
| | | | 403/326 |
| 2015/0076304 A1* | 3/2015 | Hattori | F16B 21/075 |
| | | | 248/231.81 |

* cited by examiner

CLIP

PRIORITY CLAIM

The present application claims priority to Japanese Patent Application No. 2017-251773 filed on Dec. 27, 2017, which said application is incorporated by reference in its entirety herein.

BACKGROUND

The present disclosure relates to a clip. More specifically, the present disclosure relates to a clip for detachably attaching an attaching article or component (e.g., an automobile interior part such as a center cluster) to an object member (e.g. an instrument panel).

A known clip is taught by, for example, Japanese Laid-Open Patent Publication No. 2009-275869 (JP2009-275869A). As shown in FIG. 15, the known clip 201 is used to attach an attaching article, e.g., an interior part (not shown), to an object member, e.g., an automobile instrument panel (not shown). The clip 201 includes a clip main body 210 made of rigid synthetic resin and having a leading end and a trailing end. The clip main body 210 is integrally formed as a unit and is configured to have a U-shape in cross section as a whole. The clip main body 210 includes a rounded head portion corresponding to the leading end thereof, a pair of retainer members or inner legs 212 continuous with the head portion at proximal end portions thereof and positioned laterally opposite to each other, and a pair of engagement members or outer legs 214 continuous with the head portion at proximal end portions thereof and positioned laterally opposite to the inner legs 212. Further, distal end portions of the outer legs 214 are integrated with distal end portions of the inner legs 212, so that the outer legs 214 can be elastically deformed or flexed inward and outward using the proximal end portions and the distal end portions thereof as supporting points.

The inner legs 212 are configured such that a rib of an attachment base (not shown) formed in the attaching article can fit into a space formed between the inner legs 212. Further, the inner legs 212 respectively have engagement projections (not shown) that are respectively configured to engage an engagement slot (not shown) formed in the rib of the attachment base when the rib is inserted into the space formed between the inner legs 212, so that the clip 201 may be immovably attached to the attachment base of the attaching article. Conversely, the outer legs 214 are respectively positioned outside of and adjacent to the inner legs 212. Each of the outer legs 214 has a curved or inclined portion that is outwardly obliquely extend from the leading end of the clip main body 210 toward the trailing end of the clip main body 210, and a shoulder portion continuous with the inclined portion and including a ridge or most-bulged portion. Further, each of the outer legs 214 has an outer inclined engagement surface 216 formed in the shoulder portion thereof.

In order to attach the attaching article to the object member, the clip main body 210 of the clip 201 is coupled to the rib of the attachment base formed in the attaching article by fitting the rib into the space formed between the inner legs 212. Thus, the clip 201 is attached to the attaching article. Thereafter, the clip main body 210 of the clip 201 attached to the attaching article is pushed into an attaching hole (not shown) formed in the object member. As a result, the outer legs 214 are introduced into the attaching hole while the inclined portions thereof are elastically flexing inward by contacting a periphery of the attaching hole. When the most-bulged portions of the outer legs 214 pass through the attaching hole, the outer legs 214 are restored or flexed outward, so that the engagement surfaces 216 of the shoulder portion can elastically engage the periphery of the attaching hole. As a result, the outer legs 214 are securely held in the attaching hole, so that the clip main body 210 can be connected to the object member. Thus, the attaching article can be attached to the object member via the clip 201. The clip 201 may have a longitudinal retention force (an engagement force to the attaching hole) that is required for retaining the attaching article on the object member.

To the contrary, in order to remove the attaching article from the object member, the clip 201 is simply pulled against the retention force of the clip 201. That is, an extraction force greater than the retention force is applied to the clip main body 210 connected to the object member. As a result, the outer legs 214 are gradually withdrawn from the attaching hole while elastically flexing inwardly. When the most-bulged portions of the outer legs 214 pass through the attaching hole, the engagement surfaces 216 of the shoulder portion of the outer legs 214 are disengaged from the periphery of the attaching hole, so that the clip main body 210 can be pulled out from the attaching hole. Thus, the attaching article can be detached from the object member.

However, in the known clip 201, the clip main body 210 is connected to the object member by elastic forces of the outer legs 214. Therefore, when the clip main body 210 is repeatedly inserted into and extracted from the attaching hole of the object member, the engagement surfaces 216 of the shoulder portion of the outer legs 214 may be worn out by repeatedly contacting the periphery of the attaching hole. As a result, as shown in FIG. 16, the retention force of the clip 201 may be gradually reduced when the clip main body 210 is repeatedly inserted into and extracted from the attaching hole. That is, the retention force of the clip 201 may be out of an allowable range due to a repeat of insertion and extraction of the clip main body 210. This means that the attaching article cannot be reliably held on the object member.

Thus, there is a need in the art for improved clips.

SUMMARY

For example, in one aspect of the present disclosure, a clip is intended to detachably attach an attaching article to an object member by inserting a clip main body thereof coupled to a coupling rib of an attachment base formed in the attaching article into an attaching hole formed in the object member. The clip main body may include a head portion, a pair of inner legs continuous with the head portion and respectively configured to engage the coupling rib of the attachment base, and a pair of elastically deformable outer legs respectively continuous with distal end portions of the inner legs and having distal end portions positioned adjacent to the head portion. The outer legs are configured such that when an extraction force is applied to the clip main body in an attached condition in which the clip main body connected to the coupling rib of the attachment base is inserted into and held in the attaching hole of the object member while pressing portions formed in the distal end portions of the outer legs are respectively pressed to bearing surfaces formed in a bearing member, the pressing portions of the outer legs are respectively disengaged from the bearing surfaces of the bearing member so as to not be pressed to the bearing surfaces before most-bulged portions formed in the outer legs pass through a rear surface-side periphery of the attaching hole.

According to the aspect of the present disclosure, when the extraction force is applied to the clip main body in the attached condition of the clip main body, the pressing portions of the outer legs may respectively be disengaged from the bearing surfaces of the bearing member before the most-bulged portions of the outer legs pass through the rear surface-side periphery of the attaching hole. Therefore, when the most-bulged portions of the outer legs are disengaged from the rear surface-side periphery of the attaching hole, pressing forces (reaction forces) of the outer legs may be effectively reduced. Therefore, when the most-bulged portions are disengaged from the rear surface-side periphery of the attaching hole, the outer legs may be relatively easily and smoothly flexed inward. As a result, the most-bulged portions of the outer legs may be effectively prevented from being worn out when the most-bulged portions pass through the rear surface-side periphery of the attaching hole. Therefore, even if the clip is repeatedly inserted into and extracted from the attaching hole, wear of the most-bulged portions of the outer legs may be minimized. As a result, a retention force of the clip may be prevented from being reduced.

Optionally, the outer legs may respectively may have stopper portions that are respectively formed in the distal end portions thereof so as to be positioned adjacent to distal end peripheries thereof. The stopper portions may respectively be oppositely project inward beyond the pressing portions. Further, the outer legs respectively may have depressed portions that are respectively formed in the distal end portions thereof so as to be positioned across the pressing portions from the stopper portions.

Other objects, features and advantages of the present disclosure will be readily understood after reading the following detailed description together with the accompanying drawings and the claims.

DETAILED DESCRIPTION

Detailed representative embodiments of the present disclosure are shown in FIGS. 1 to 14.

First Embodiment

A first detailed representative embodiment of the present disclosure will be described with reference to FIGS. 1 to 8.

Figure 1:
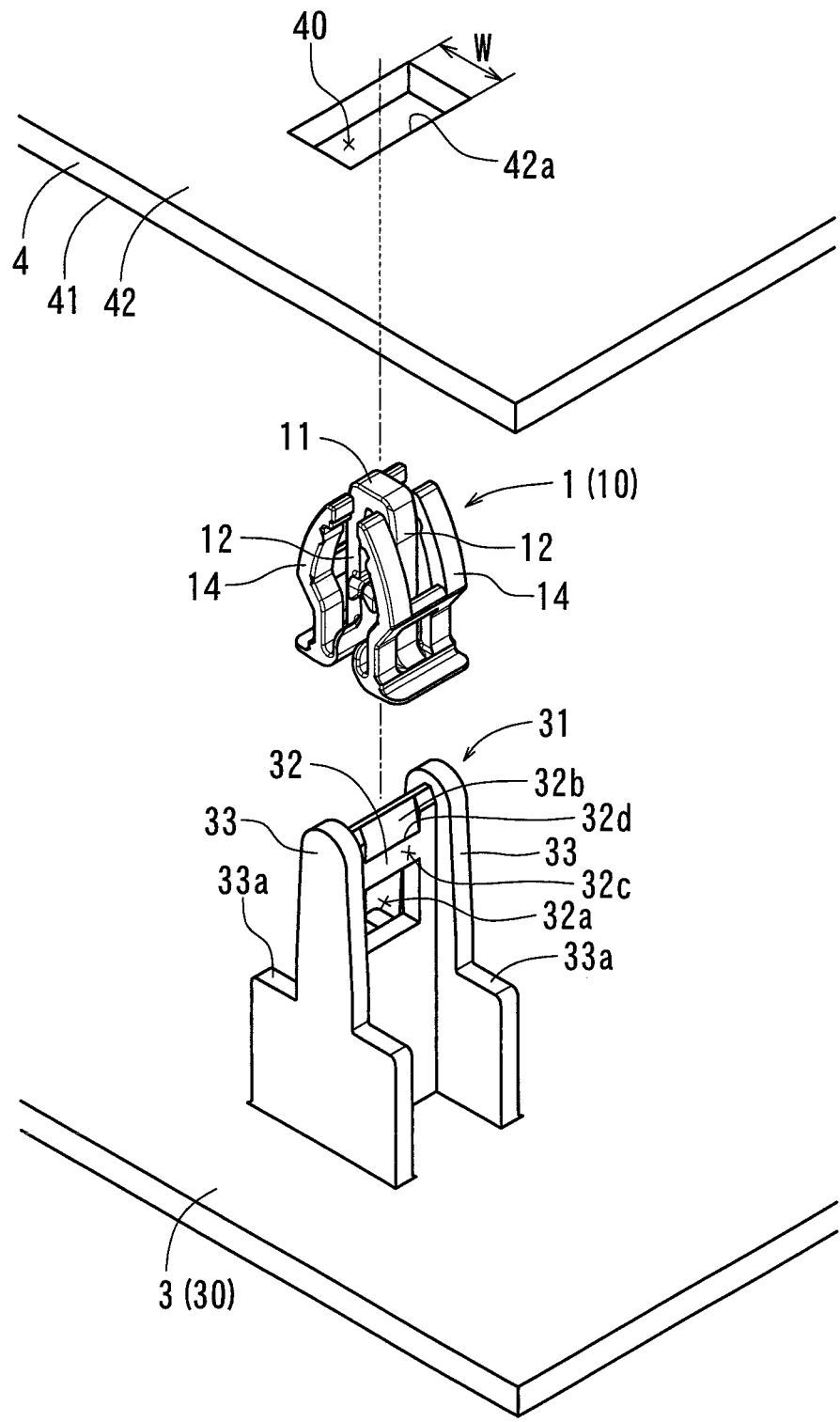
FIG. 1 is a perspective view of a clip according to a first embodiment, an attaching article and an object member, which illustrates a condition before the attaching article is attached to the object member using the clip.
Figure 4:
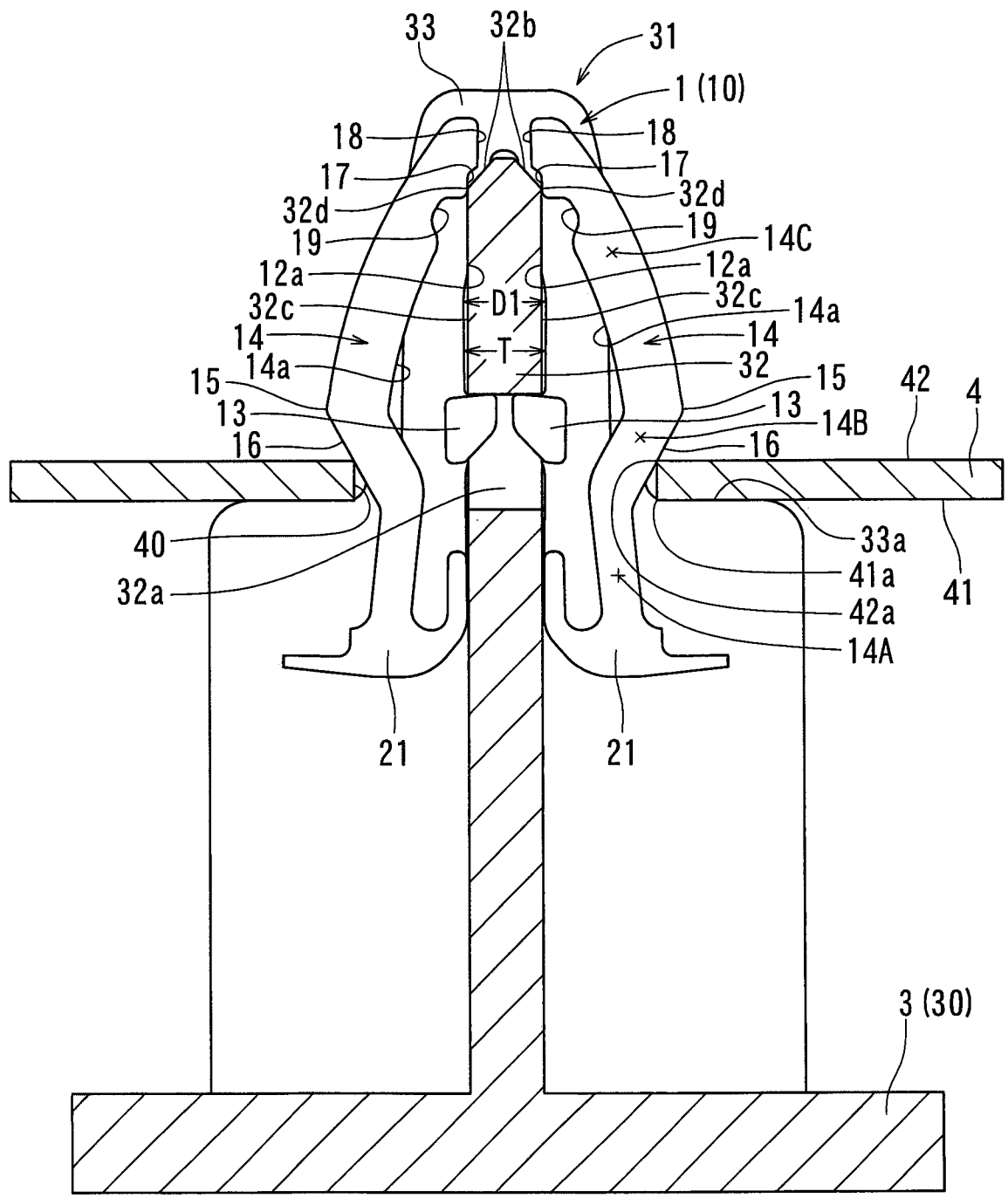
FIG. 4 is an explanatory elevational view of the clip, which illustrate a condition in which the attaching article is attached to the object member using the clip.

As shown in FIG. 1, the first embodiment may be directed to a clip 1 that is used to detachably attach an attaching article 3 (an interior part, e.g., an ornament panel) to an object member 4 (an instrument panel). In particular, the clip 1 may be configured to be coupled to a coupling rib 32 of an attachment base 31 formed in a rear surface of an attaching article main body 30 of the attaching article 3, so as to be attached to the attaching base 31 of the attaching article 3. Further, the clip 1 may be configured to be inserted into an attaching hole 40 formed in the object member 4 and having an elongated rectangular shape. Upon insertion of the clip 1 into the attaching hole 40 after the clip 1 is attached to the attachment base 31 of the attaching article 3, the attaching article 3 may be attached to the object member 4 via the clip 1 (FIG. 4). As will be recognized, a plurality of clips, a plurality of attaching bases and a plurality of attaching holes may be generally used in order to attach the attaching article 3 to the object member 4. However, one of them (i.e., the clip 1, the attachment base 31 and the attaching hole 40) may be described in this description because they have the same structure as each other.

Figure 2:
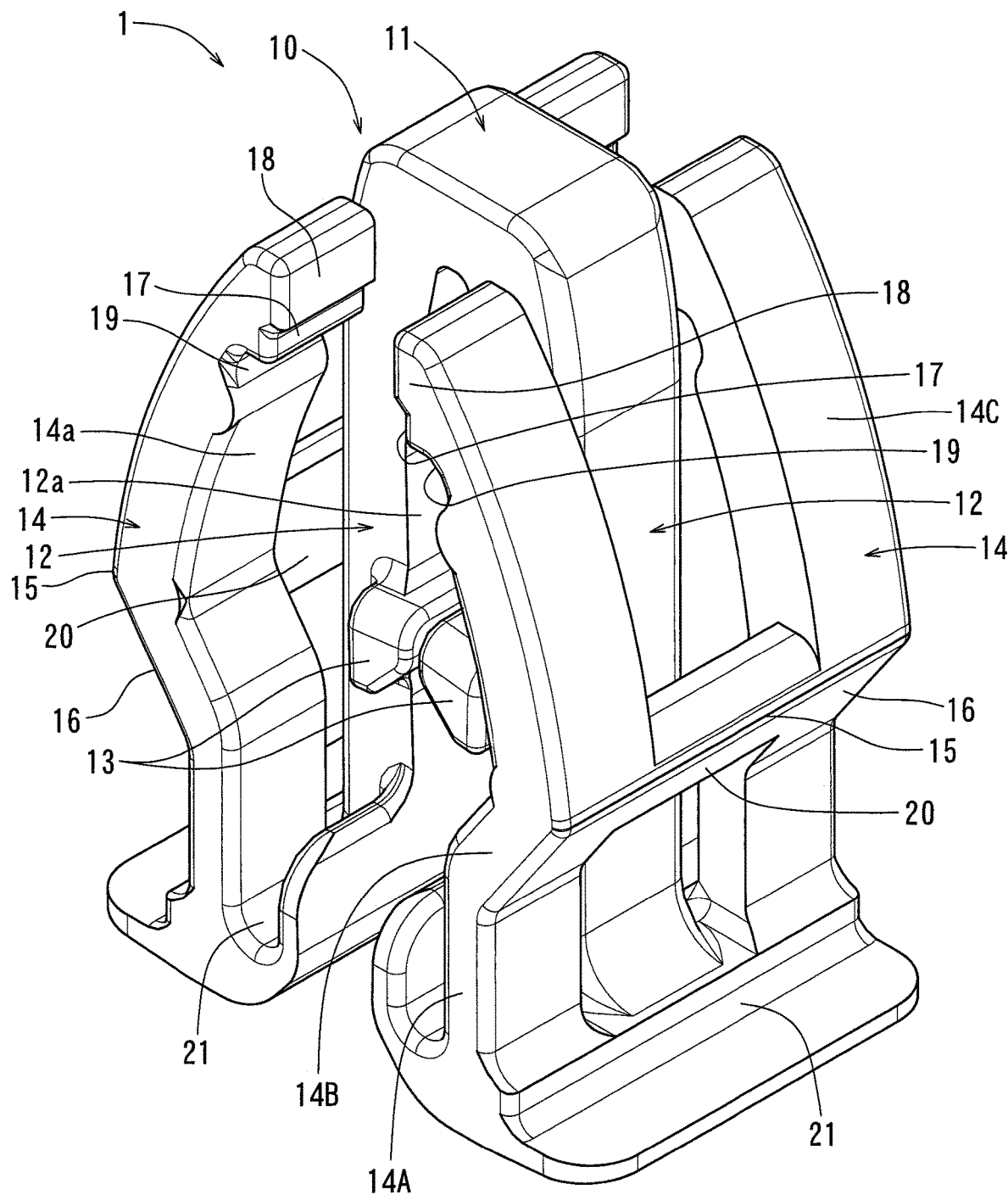
FIG. 2 is an enlarged perspective view of the clip.
Figure 3:
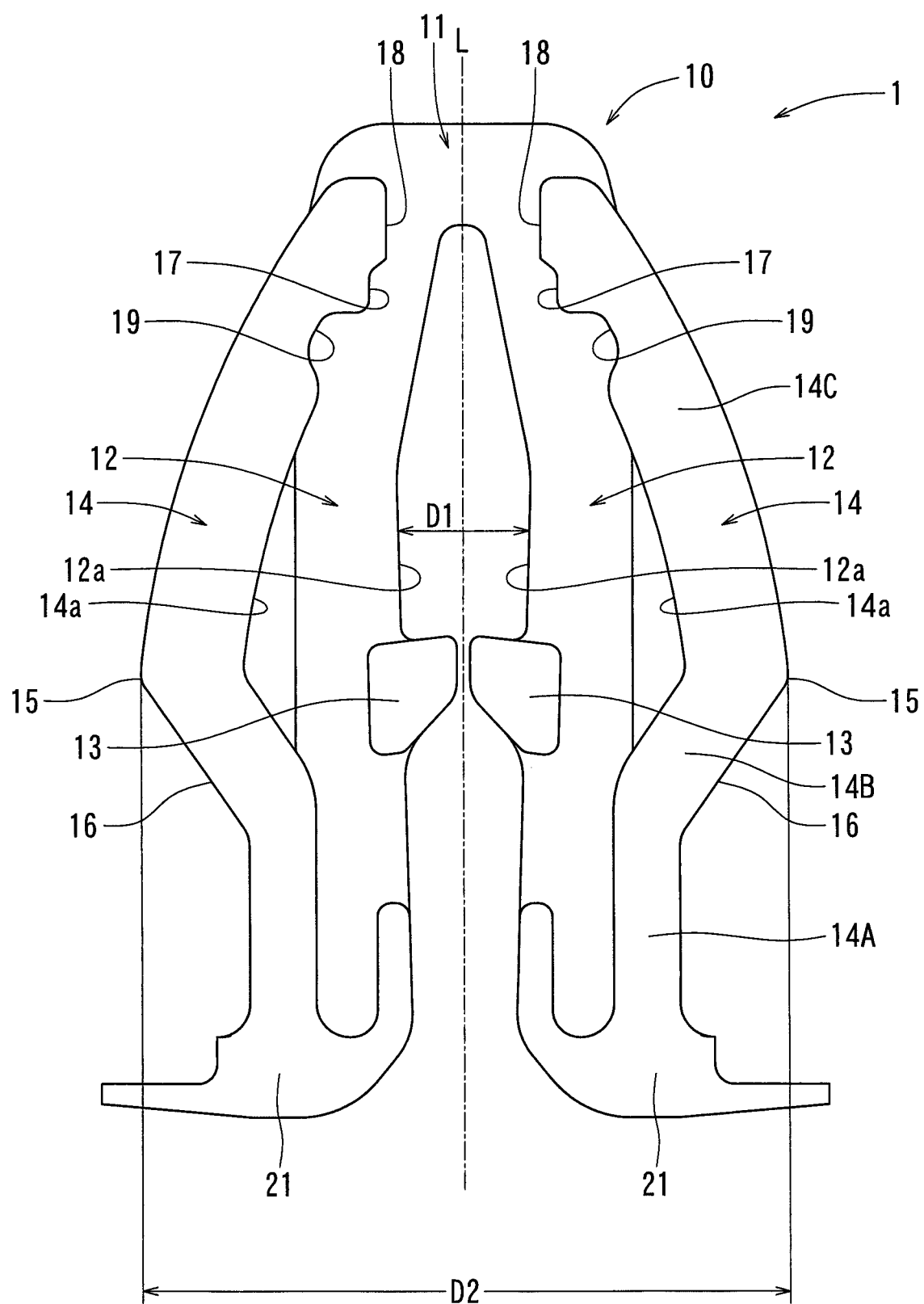
FIG. 3 is an enlarged elevational view of the clip.

As shown in FIGS. 2 and 3, the clip 1 may include a clip main body 10 made of rigid synthetic resin, e.g., polypropylene (PP), and configured to have a wedged leading end and an open trailing end. The clip main body 10 may be integrally formed as a unit. Further, the clip main body 10 may be shaped to have a U-shape in cross section as a whole. As shown in FIG. 2, the clip main body 10 may have a rounded head (guide) portion 11 corresponding to the leading end thereof, a pair of retainer members or inner legs 12 continuous with the head portion 11 and positioned laterally opposite to each other, and a pair of engagement members or outer legs 14 positioned adjacent to the inner legs 12 and laterally opposite to each other.

As shown in FIGS. 2 and 3, the inner legs 12 may respectively extend from the head portion 11 along a longitudinal axis L of the clip 1, so as to respectively have proximal end portions corresponding to the leading end of the clip main body 10 and distal (free) end portions corresponding to the trailing end of the clip main body 10. The inner legs 12 may respectively be configured to have substantially straight retainer portions that extend in substantially parallel with each other along the longitudinal axis L of the clip 1. Further, the inner legs 12 may be configured such that a distance D1 between inner surfaces 12*a* of the retainer portions thereof is substantially identical to or slightly smaller than a thickness T of the coupling rib 32 of the attachment base 31 formed in the attaching article 3 (FIGS. 4 to 7). That is, the inner legs 12 may be configured such that the coupling rib 32 of the attachment base 31 can fit into a space formed between the retainer portions of the inner legs 12.

As shown in FIGS. 2 and 3, the inner legs 12 may respectively have engagement projections 13 that are respectively formed in the inner surfaces 12*a* of the retainer portions thereof. The engagement projections 13 may respectively be laterally oppositely projected inward. Further, the engagement projections 13 may respectively be configured to engage a rectangular engagement slot 32*a* formed in the coupling rib 32 of the attachment base 31 formed in the attaching article 3 when the coupling rib 32 of the attachment base 31 is inserted into the space formed between the retainer portions of the inner legs 12, so that the clip 1 (the clip main body 10) may be substantially immovably connected to the attachment base 31 of the attaching article 3.

As shown in FIGS. 2 and 3, the outer legs 14 may respectively be connected to distal end portions of the inner legs 12 and configured to be elastically deformed or flexed laterally inward and outward about the distal end portions of the inner legs 12. In particular, the outer legs 14 may respectively be formed as split or slotted wing-shaped members having widened foot portions 21 respectively integrated with the distal end portions of the inner legs 12 and having transverse reinforcement portions 20. Further, the outer legs 14 may respectively extend from the distal end portions of the inner legs 12 toward the proximal end portions of the inner legs 12 along the longitudinal axis L of the clip 1, so as to respectively have proximal end portions corresponding to the trailing end of the clip main body 10 and distal (free) end portions corresponding to the leading end of the clip main body 10. Thus, the outer legs 14 may be formed as cantilevered frame-shaped members configured to be elastically deformed about the distal end portions of the inner legs 12 (the foot portions 21 of the outer legs 14).

As best shown in FIG. 3, each of the outer legs 14 may be composed of a straight root portion 14A extending from the proximal end portion (the foot portions 21) thereof along the longitudinal axis L of the clip 1, an inclined shoulder portion 14B obliquely bent outward from the root portion 14A and including a most-flared or most-bulged portion 15, and a curved main portion 14C arcuately bent inward from the most-bulged portion 15 of the shoulder portion 14B toward the distal end portion thereof. Each of the outer legs 14 may have an inclined outer engagement surface 16 formed in the shoulder portion 14B thereof. The outer engagement surface 16 may be configured to engage a rear surface-side periphery 42*a* of the attaching hole 40 formed in the object member 4 when the clip 1 coupled to the coupling rib 32 of the attachment base 31 formed in the attaching article main body 30 is inserted into the attaching hole 40.

Further, the outer legs 14 may respectively have contacting surfaces or pressing portions 17 formed in the distal end portions thereof and extending in a width direction of the clip 1. In particular, the pressing portions 17 may respectively be oppositely formed in inner or rear surfaces 14*a* of the outer legs 14. The pressing portions 17 may respectively be configured to contact and press opposite bearing surfaces 32*c* of the coupling rib 32 (which may be referred to as a bearing member) when the clip 1 coupled to the coupling rib 32 is inserted into the attaching hole 40 formed in the object member 4. Further, the outer legs 14 may respectively have stopper portions 18 formed in the distal end portions thereof. The stopper portions 18 may respectively be positioned adjacent to the pressing portions 17 while extending along distal end peripheries of the outer legs 14. The stopper portions 18 may respectively oppositely project inward beyond the pressing portions 17. Further, the outer legs 14 may respectively have depressed portions 19 formed in the distal end portions thereof. The depressed portions 19 may respectively be positioned across the pressing portions 17 from the stopper portions.

As shown in FIG. 2, the reinforcement portions 20 may respectively be formed in the shoulder portions 14B of the outer legs 14. Therefore, the outer engagement surfaces 16 respectively formed in the shoulder portions 14B may be relatively widened. As a result, the outer engagement surfaces 16 may securely engage the attaching hole 40 formed in the object member 4 when the clip 1 coupled to the coupling rib 32 of the attachment base 31 formed in the attaching article main body 30 is inserted into the attaching hole 40 formed in the object member 4. Further, the outer legs 14 may be configured such that a distance D2 between the most-bulged portions 15 is greater than a width W of the attaching hole 40 formed in the object member 4 (FIGS. 1 and 3).

The attaching article 3 may be made of rigid synthetic resin, e.g., PP. As shown in FIG. 1, the attaching article 3 (the attaching article main body 30 and the attaching base 31) may be integrally formed as a unit. In particular, the attachment base 31 may preferably be integrally formed in the rear surface of the attaching article main body 30 (i.e., a surface opposite to an ornamental surface of the attaching article main body 30). As previously described, the coupling rib 32 of the attachment base 31 may be configured to be introduced into the space formed between the retainer portions of the inner legs 12. Further, the rectangular engagement slot 32*a* of the coupling rib 32 may be formed as a through bore passing through the coupling rib 32. Further, the coupling rib 32 may have tapered end surfaces 32*b* (which may referred to as release surfaces) formed in a distal end portion thereof and having a desired taper angle, so as to be smoothly inserted into the space formed between the retainer portions of the inner legs 12 when the clip main body 10 is attached to the coupling rib 32. The tapered end surfaces 32*b* may respectively be continuous with the bearing surfaces 32*c* via edge portions 32*d*. Further, as shown in FIG. 1, the taper angle of the tapered end surfaces 32*b* may be relatively increased at widthwise both ends.

Further, the attachment base 31 of the attaching article 3 may have a pair of guide ribs 33 that are respectively positioned on widthwise opposite ends of the coupling rib 32. The guide ribs 33 may function to guide the clip 1 when the clip main body 10 is attached to the coupling rib 32. Further, the guide ribs 33 may respectively be composed of guide portions and widened stopper portions. That is, each of the guide ribs 33 may be formed as a T-shaped member having a pair of shouldered portions 33*a* positioned on both sides of the guide portions. Each of the guide portions may preferably have a width substantially equal to or smaller than the width W of the attaching hole 40 formed in the object member 4, so as to be introduced into the attaching hole 40. Conversely, the widened stopper portion of each of the guide ribs 33 may have a width greater than the width W of the attaching hole 40 such that the shouldered portions 33a may contact a front surface 41 of the object member 4 when the clip 1 coupled to the coupling rib 32 of the attachment base 31 formed in the attaching article main body 30 is inserted into the attaching hole 40 (FIG. 4).

Next, a method of attaching the attaching article 3 to the object member 4 using the clip 1 and detaching the attaching article 3 from the object member 4 will now be described in detail with reference to FIGS. 4 to 7.

First, the clip main body 10 is pressed to the coupling rib 32 of the attachment base 31 formed in the attaching article 3 at the trailing end thereof. As a result, the coupling rib 32 of the attachment base 31 can be introduced into the space formed between the retainer portions of the inner legs 12 while the coupling rib 32 is clamped by the inner legs 12. At the same time, the engagement projections 13 formed in the inner surfaces 12a of the inner legs 12 may engage the engagement slot 32a formed in the coupling rib 32 of the attachment base 31. Thus, the clip 1 can be connected to the attachment base 31 of the attaching article 3.

Thereafter, the clip 1 coupled to the attachment base 31 of the attaching article 3 may be pushed into the attaching hole 40 formed in the object member 4 at the leading end of the clip main body 10. As a result, the outer legs 14 of the clip 1 may be progressively introduced into the attaching hole 40 while the outer legs 14 are elastically flexed inward about the foot portions 21 thereof by interference of the curved main portions 14C of the outer legs 14 with a front surface-side periphery 41a of the attaching hole 40. Subsequently, when the most-bulged portions 15 of the shoulder portions 14B of the outer legs 14 pass through the attaching hole 30, the outer legs 14 can be gradually restored or flexed outward, so that the outer engagement surface 16 of the shoulder portions 14B continuous with the most-bulged portions 15 can elastically engage the rear surface-side periphery 42a of the attaching hole 40 due to elastic forces of the outer legs 14 while facing a rear surface 42 of the object member 4. At this time, the shouldered portions 33a formed in the guide ribs 33 of the attachment base 31 may contact the front surface 41 of the object member 4, so that the clip 1 may be prevented from being excessively introduced into the attaching hole 40. As a result, the clip 1 may be held in a predetermined position in the attaching hole 40 due to the elastic forces of the outer legs 14, so as to be connected to the object member 4. Thus, the attaching article 3 may be attached to the object member 4 via the clip 1 (FIG. 4).

Further, as shown in FIG. 4, in an attached condition in which the clip 1 connected to the attachment base 31 of the attaching article 3 is inserted into and held in the attaching hole 40 of the object member 4 due to the elastic forces of the outer legs 14, the pressing portions 17 of the outer legs 14 may respectively be pressed to the bearing surfaces 32c of the coupling rib 32 of the attachment base 31. Therefore, the outer legs 14 may substantially be prevented from being freely flexed inward about the foot portions 21 thereof. As a result, the outer legs 14 may have considerable flexure resistance forces. That is, the outer legs 14 may have considerable pressing forces exerted on the rear surface-side periphery 42a of the attaching hole 40 at the outer engagement surfaces 16. This means that considerable reaction forces against the pressing forces may be generated in the outer legs 14 at the outer engagement surfaces 16. Therefore, the clip 1 may have a desired retention force (a desired engagement force to the attaching hole 40) that is required for retaining the attaching article 3 on the object member 4. As a result, even if a certain degree of extraction force is unexpectedly applied to the clip main body 10, the clip 1 may be effectively prevented from being extracted from the attaching hole 40.

Figure 5:
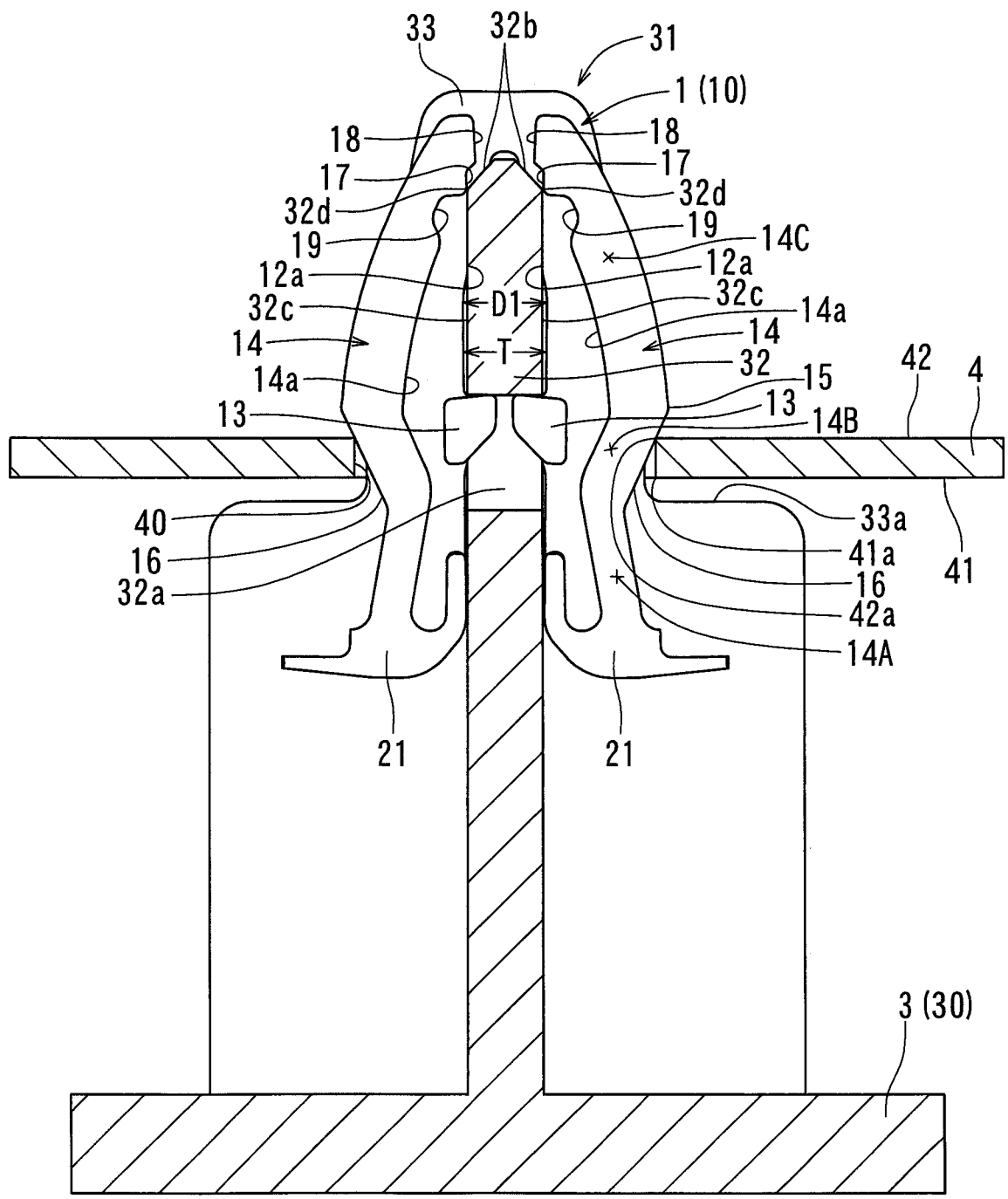
FIG. 5 is an explanatory elevational view of the clip, which illustrate a condition in which an extraction force is applied to a clip main body of the clip shown in FIG. 4.

To the contrary, in order to remove the attaching article 3 from the object member 4, the attaching article 3 may be simply pulled, so that the clip 1 connected to the object member 4 may be pulled against the retention force of the clip 1. That is, an extraction force greater than the retention force of the clip 1 may be applied to the clip 1 (the clip main body 10). As a result, the outer legs 14 may be elastically bent or flexed inward by the rear surface-side periphery 42a of the attaching hole 40 contacting the outer engagement surfaces 16 of the shoulder portions 14B, so that the outer legs 14 are gradually withdrawn from the attaching hole 40 (FIG. 5). As will be recognized, at this time, each of the outer legs 14 may be flexed inward with both of the foot portion 21 (the proximal end portion) and the pressing portion 17 (the distal end portion) thereof serving or functioning as double supporting points while the pressing portion 17 slides along one of the bearing surfaces 32c of the coupling rib 32 toward one of the tapered end surfaces 32b continuous with the bearing surface 32c. Further, in this condition (a first extraction stage), the clip 1 may still have the desired retention force.

Figure 6:
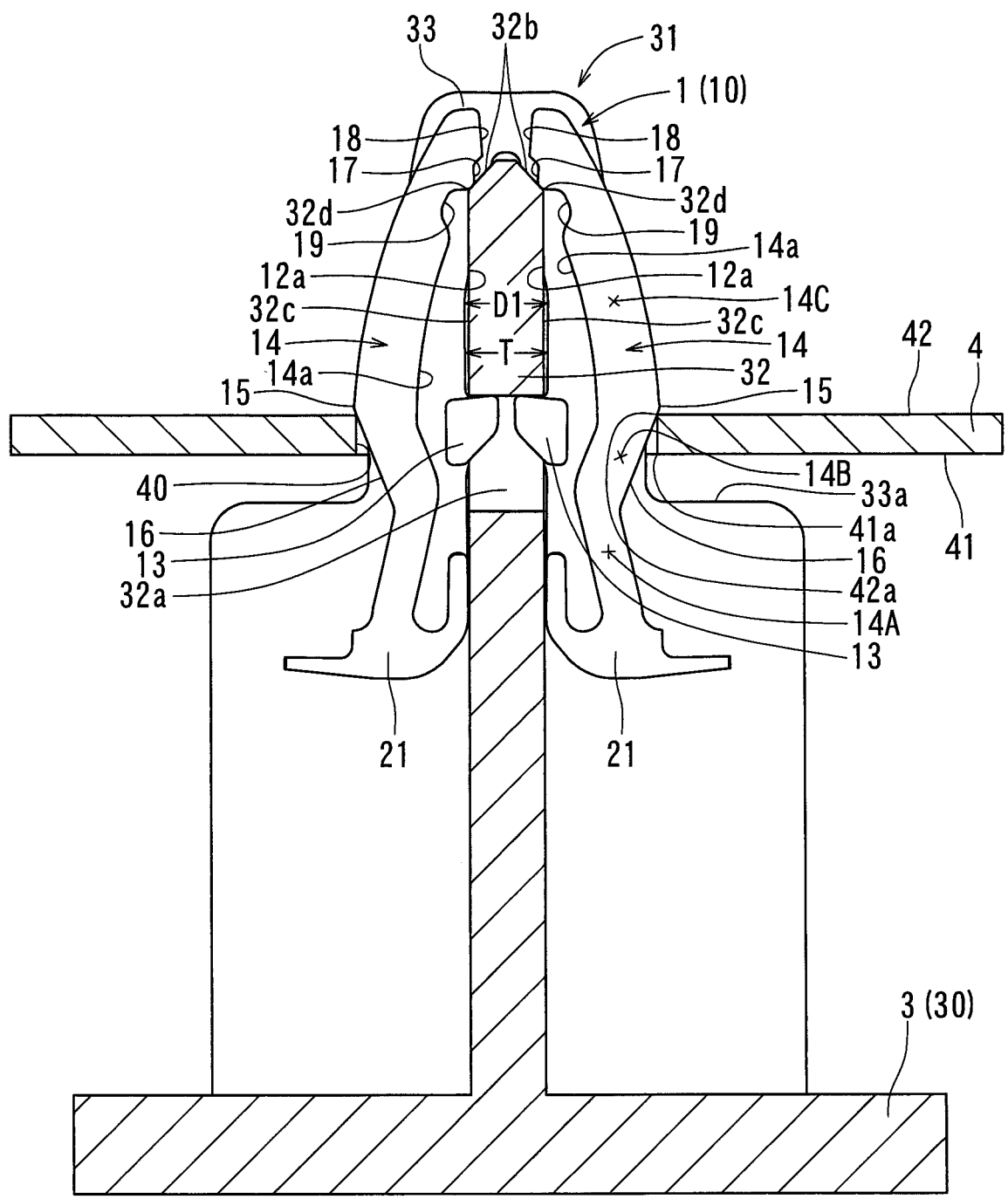
FIG. 6 is an explanatory elevational view of the clip, which illustrate a condition in which the extraction force is further applied to the clip main body of the clip shown in FIG. 5.

Thereafter, when the extraction force is continuously applied to the clip 1, each of the outer legs 14 may be further flexed inward with the foot portion 21 and the pressing portion 17 thereof functioning as the double supporting points. As a result, the pressing portions 17 of the outer legs 14 may respectively be disengaged from the bearing surfaces 32c of the coupling rib 32 before the most-bulged portions 15 of the shoulder portion 14B reach and pass through the rear surface-side periphery 42a of the attaching hole 40, so as to be displaced or moved to the tapered end surfaces 32b formed in the distal end portion of the coupling rib 32 (FIG. 6). Therefore, when the extraction force is further applied to the clip, each of the outer legs 14 may be flexed inward with only the foot portions 21 thereof serving or functioning as a single supporting point until the most-bulged portion 15 (the outer engagement surface 16) thereof is disengaged from the rear surface-side periphery 42a of the attaching hole 40 because the pressing portion 17 thereof may slide along one of the tapered end surfaces 32b of the coupling rib 32. As a result, the flexure resistance forces of the outer legs 14 may be effectively reduced. That is, the pressing forces (the reaction forces) of the outer legs 14 may be reduced. Thus, the retention force of the clip 1 may be reduced before the most-bulged portions 15 of the shoulder portion 14B reach and pass through the rear surface-side periphery 42a of the attaching hole 40. This means that in this condition (a second extraction stage), the outer legs 14 may be easily withdrawn from the attaching hole 40 relative to the previous condition (the first extraction stage).

When the extraction force is further applied to the clip 1 after the most-bulged portions 15 are disengaged from the rear surface-side periphery 42a of the attaching hole 40, the outer legs 14 may be gradually withdrawn from the attaching hole 40 while the curved main portions 14C of the outer legs 14 contact an inner surface of the attaching hole 40. In this extraction stage (a third extraction stage), each of the outer legs 14 may be flexed or restored outward due to elasticity thereof with the foot portion 21 thereof functioning as the single supporting point while the pressing portion 17 thereof may successively slide along one of the tapered end surfaces 32b of the coupling rib 32 toward one of the bearing surfaces 32c continuous with the tapered end surface 32b. Further, in this condition, the retention force of the clip 1 may be further reduced.

Figure 7:
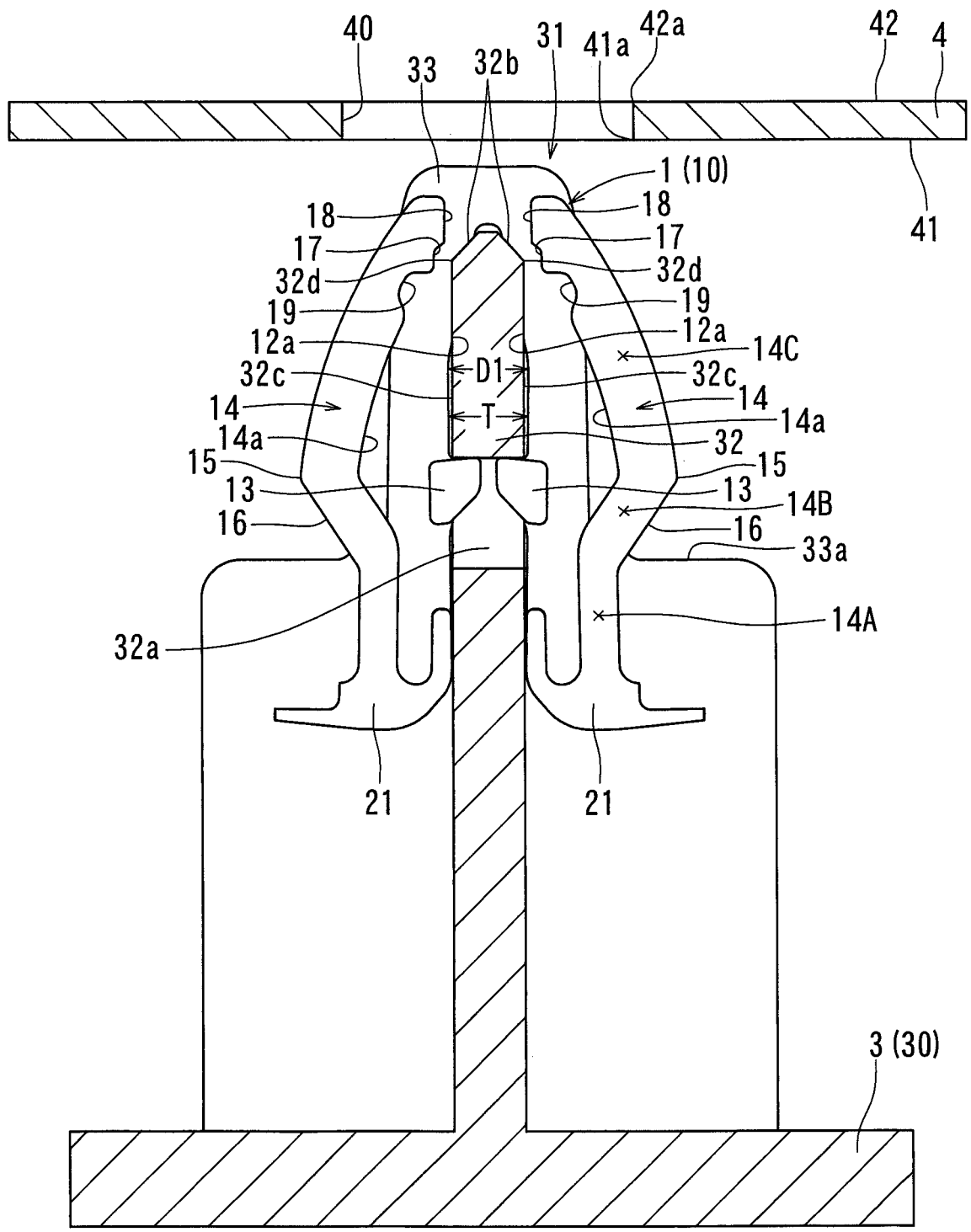
FIG. 7 is an explanatory elevational view of the clip, which illustrate a condition in which the extraction force is applied to the clip main body of the clip shown in FIG. 6.

In this condition, when the clip 1 is further pulled, the curved main portions 14C of the outer legs 14 may be gradually spaced from the inner surface of the attaching hole 40 while the pressing portions 17 may be spaced from the bearing surfaces 32c of the coupling rib 32, so that the outer legs 14 may be completely withdrawn from the attaching hole 40. Further, at this time, the outer legs 14 may be completely flexed or restored outward such that the pressing portions 17 may be spaced from the bearing surfaces 32c of the coupling rib 32. Thus, the clip 1 may be pulled out from the attaching hole 40, so that the attaching article 3 may be removed from the object member 4 (FIG. 7).

Figure 8:
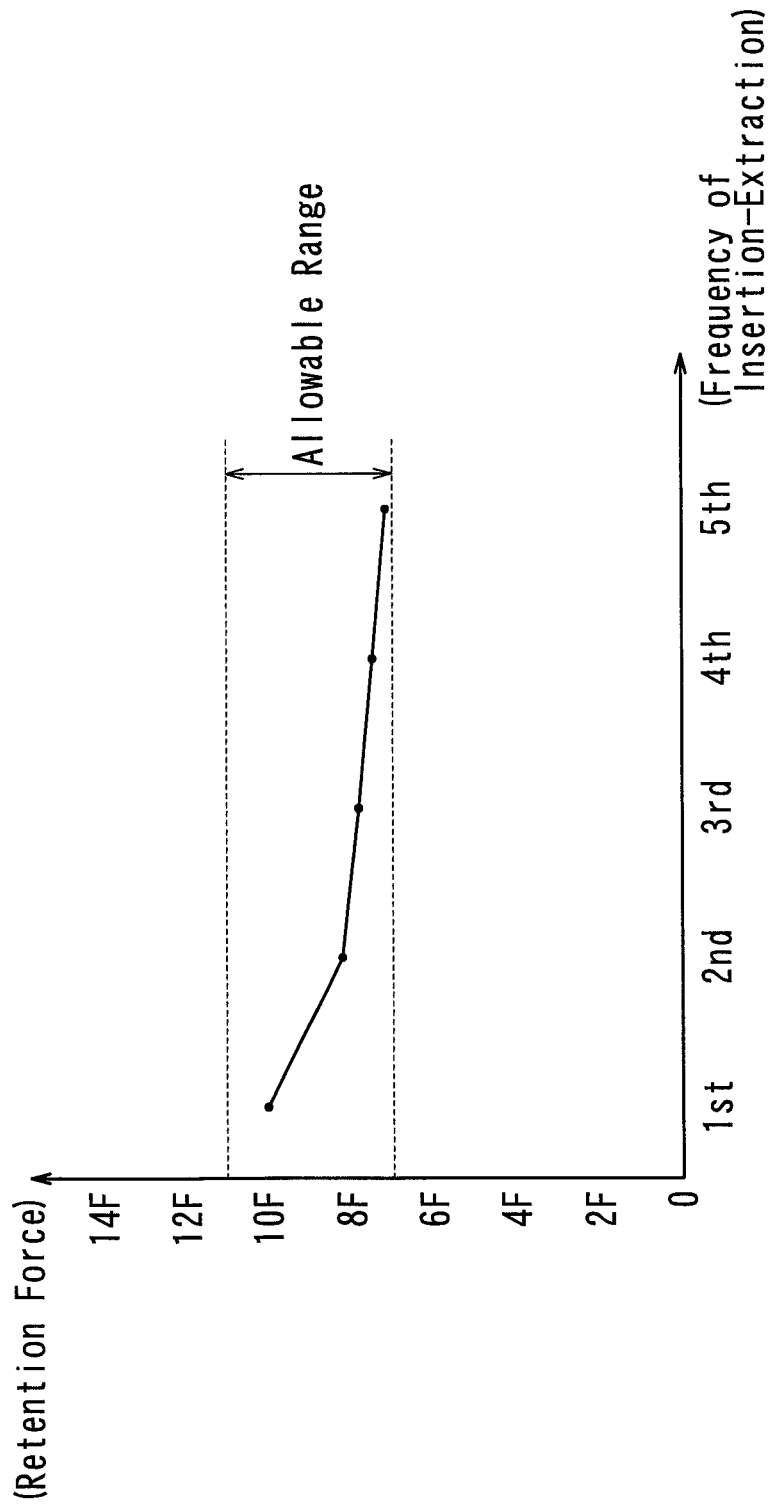
FIG. 8 is a graph illustrating a relationship between an insertion-extraction number of the clip main body of the clip and a retention force in the clip.

According to the embodiment, when the clip 1 is pulled against the retention force thereof in the attached condition of the clip 1, the pressing portions 17 of the outer legs 14 may respectively be displaced from the bearing surfaces 32c of the coupling rib 32 to the tapered end surfaces 32b of the coupling rib 32 before the most-bulged portions 15 of the outer legs 14 reach and pass through the rear surface-side periphery 42a of the attaching hole 40. Therefore, when the most-bulged portions 15 (the outer engagement surfaces 16) of the outer legs 14 are disengaged from the rear surface-side periphery 42a of the attaching hole 40, the pressing forces (the reaction forces) of the outer legs 14 may be effectively reduced. That is, the retention force of the clip 1 may be effectively reduced. Therefore, when the most-bulged portions 15 (the outer engagement surfaces 16) are disengaged from the rear surface-side periphery 42a of the attaching hole 40, the outer legs 14 may be relatively easily flexed inward. As a result, the most-bulged portions 15 (the outer engagement surfaces 16) of the outer legs 14 may be effectively prevented from being worn out when the most-bulged portions 15 pass through the rear surface-side periphery 42a of the attaching hole 40. Therefore, even if the clip 1 is repeatedly inserted into and extracted from the attaching hole 40, wear of the most-bulged portions 15 (the outer engagement surfaces 16) of the outer legs 14 may be minimized. As a result, the retention force of the clip 1 may be prevented from being reduced. In particular, as shown in FIG. 8, even if the clip 1 is repeatedly used, the retention force of the clip 1 may fall within an allowable range. This means that the attaching article 3 can be reliably held on the object member 4 even if the attaching article 3 is repeatedly attached to and removed from the object member 4.

Further, when the clip 1 coupled to the attachment base 31 of the attaching article 3 may be pushed into the attaching hole 40 formed in the object member 4 at the leading end (the head portion 11) of the clip main body 10, the curved main portions 14C of the outer legs 14 may interfere with the front surface-side periphery 41a of the attaching hole 40, so that the outer legs 14 may respectively be flexed inward. At this time, the stopper portions 18 of the outer legs 14 may respectively engage the tapered end surfaces 32b of the coupling rib 32. Therefore, the outer legs 14 may be effectively prevented from being excessively longitudinally deformed or buckled.

As described above, when the clip 1 is pulled against the retention force thereof in the attached condition of the clip 1, the pressing portions 17 of the outer legs 14 may respectively be displaced from the bearing surfaces 32c of the coupling rib 32 to the tapered end surfaces 32b of the coupling rib 32 before the most-bulged portions 15 of the outer legs 14 reach and pass through the rear surface-side periphery 42a of the attaching hole 40. At this time, the edge portions 32d between the tapered end surfaces 32b and the bearing surfaces 32c may enter the depressed portions 19 formed in the outer legs 14 (FIG. 6). Therefore, each of the outer legs 14 may be prevented from interfering with one of the bearing surfaces 32c of the coupling rib 32 at the distal end portion thereof, so as to be easily flexed with the foot portion 21 thereof serving or functioning as the single supporting point.

Second Embodiment

A second detailed representative embodiment of the present disclosure will be described with reference to FIGS. 9 to 14. Further, because the second embodiment relates to the first embodiment, only the constructions and elements that are different from the first embodiment will be explained in detail. Elements that are the same in the first and second embodiments will be identified by the same reference numerals and a detailed description of such elements may be omitted or simplified.

Figure 9:
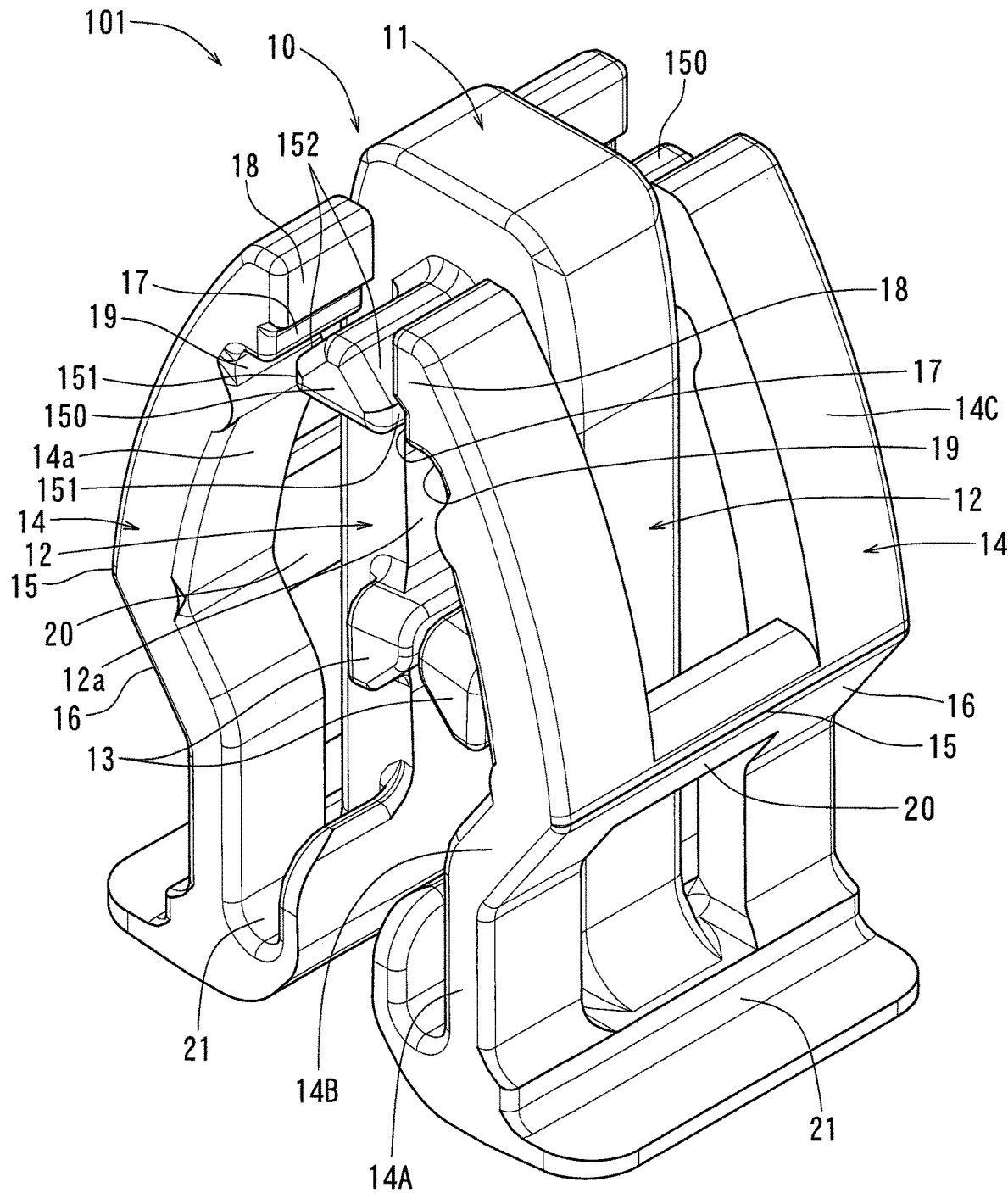
FIG. 9 is an enlarged perspective view of a clip according to a second embodiment.
Figure 10:
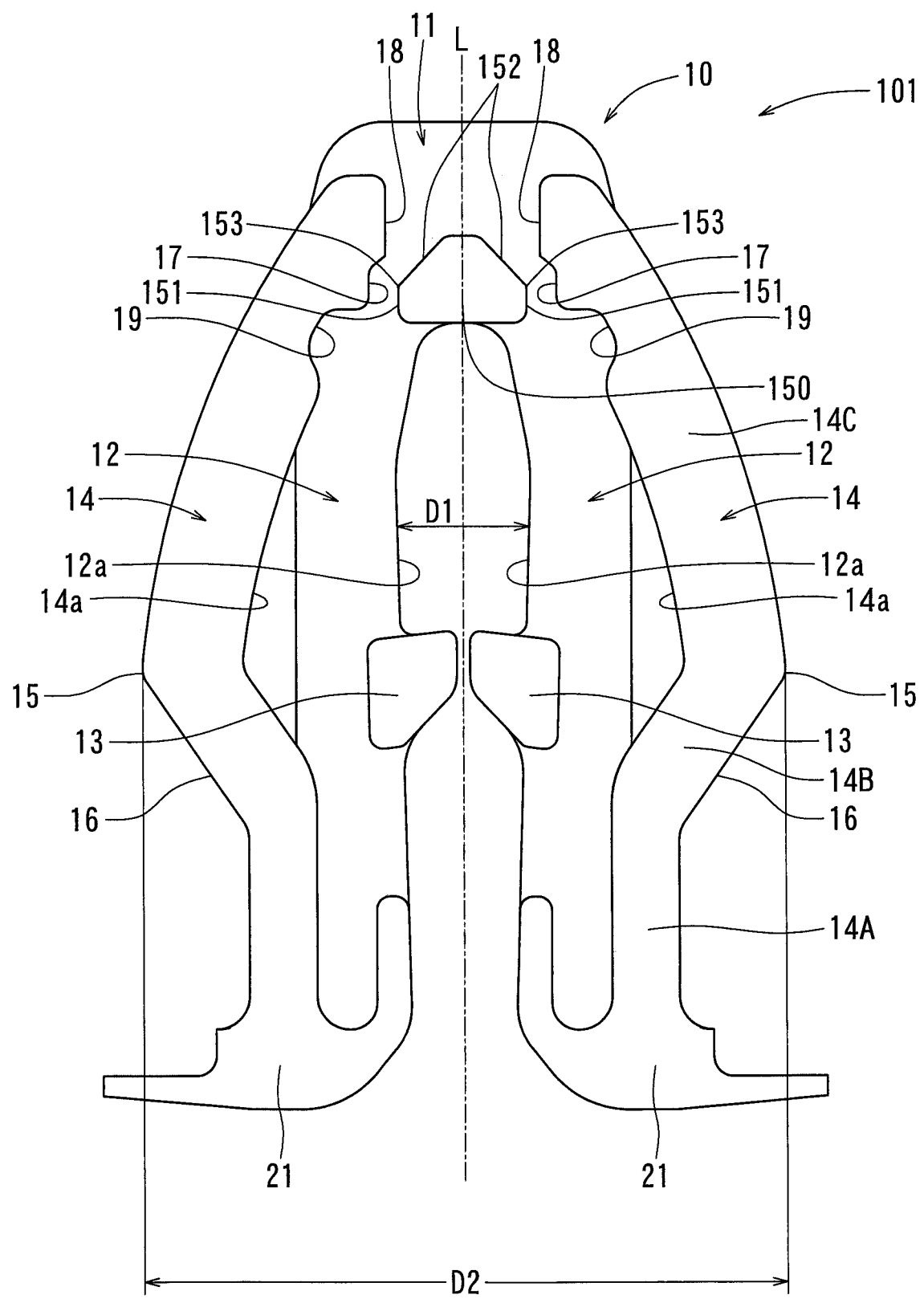
FIG. 10 is an enlarged elevational view of the clip.

A clip 101 in the second embodiment is intended to be attached to the coupling rib 32 of the attachment base 31 formed in the attaching article 3, in which the distal end portion thereof is cut off or shortened. As shown in FIG. 9, in the clip 101, the head portion 11 of the clip main body 10 may have a pair of bearing projections 150 oppositely projecting in a width direction of the clip 101. In particular, the bearing projections 150 may be positioned between and projecting along the distal end portions of the outer legs 14. As best shown in FIG. 10, each of the bearing projections 150 (which may be referred to as a bearing member) may have bearing surfaces 151 positioned laterally opposite to the distal end portions of the outer legs 14 and tapered end surfaces 152 (which may be referred to as release surfaces) having a desired taper angle. The tapered end surfaces 152 may respectively be continuous with the bearing surfaces 151 via edge portions 153.

Further, similar to the outer legs 14 the clip 1, the outer legs 14 of the clip 101 may respectively have the pressing portions 17, the stopper portions 18 and the depressed portions 19 formed in the distal end portions thereof. However, unlike the clip 1, the pressing portions 17 may respectively be configured to contact and press the bearing surfaces 151 of the bearing projections 150 when the clip 1 coupled to the coupling rib 32 is inserted into the attaching hole 40 formed in the object member 4.

Next, a method of attaching the attaching article 3 to the object member 4 using the clip 101 and detaching the attaching article 3 from the object member 4 will now be described with reference to FIGS. 11 to 14.

First, the clip 101 may be connected to the attachment base 31 of the attaching article 3 in the same manner as clip 1. Thereafter, similar to the first embodiment, the clip 101 connected to the attachment base 31 of the attaching article 3 may be held in the attaching hole 40 formed in the object member 4. Thus, the attaching article 3 may be attached to the object member 4 via the clip 101 (FIG. 11).

Figure 11:
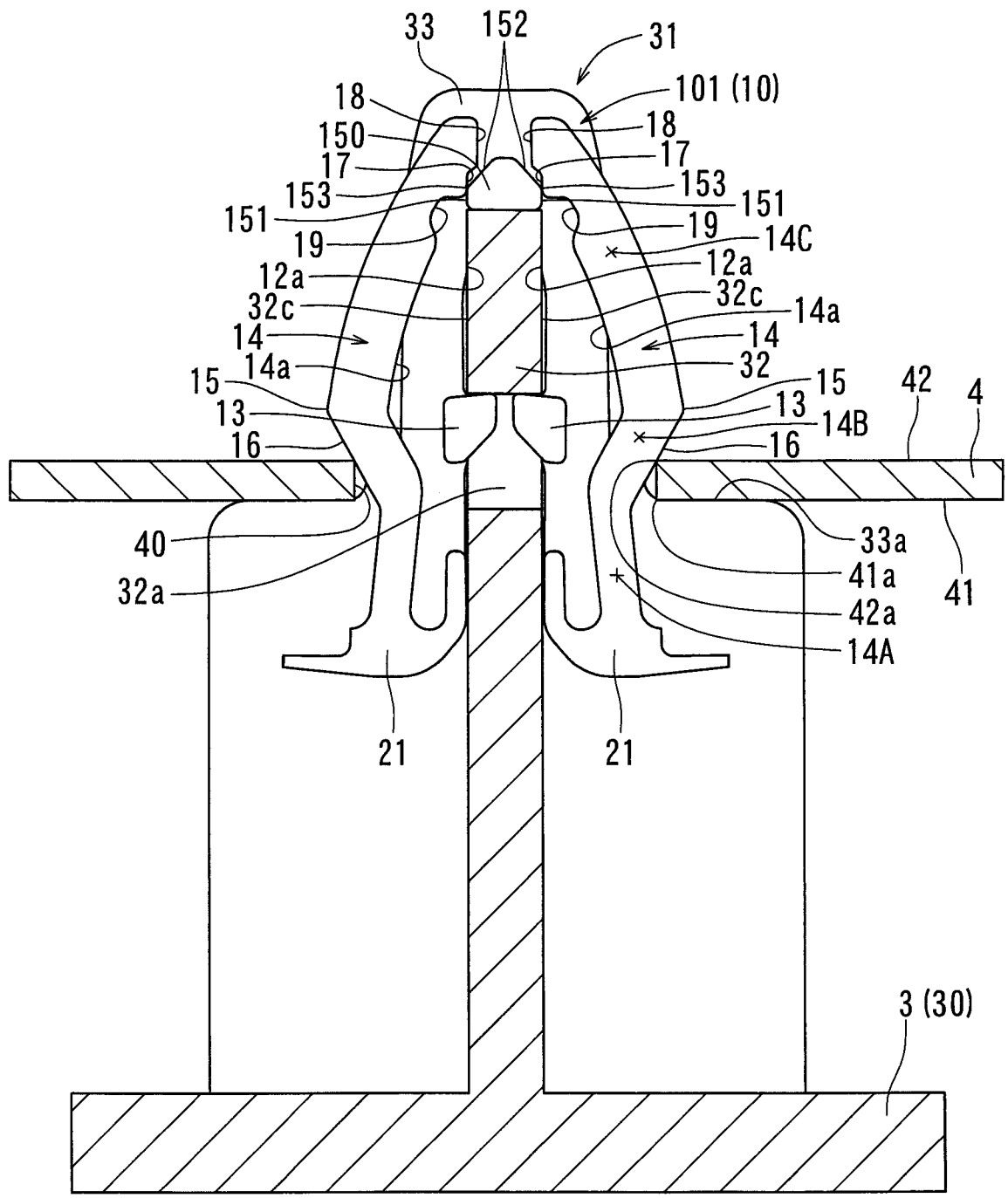
FIG. 11 is an explanatory elevational view of the clip, which illustrate a condition in which the attaching article is attached to the object member using the clip.

Further, as shown in FIG. 11, in an attached condition in which the clip 101 connected to the attachment base 31 of the attaching article 3 is inserted into and held in the attaching hole 40 of the object member 4, the pressing portions 17 of the outer legs 14 may respectively be pressed to the bearing surfaces 151 of the bearing projections 150 formed in the head portion 11. Therefore, similar to the first embodiment, the outer legs 14 may substantially be prevented from being freely flexed inward about the foot portions 21 thereof. As a result, similar to the first embodiment, the outer legs 14 may have considerable pressing forces exerted on the rear surface-side periphery 42*a* of the attaching hole 40 at the outer engagement surfaces 16. Therefore, the clip 101 may have a desired retention force that is required for retaining the attaching article 3 on the object member 4.

Figure 12:
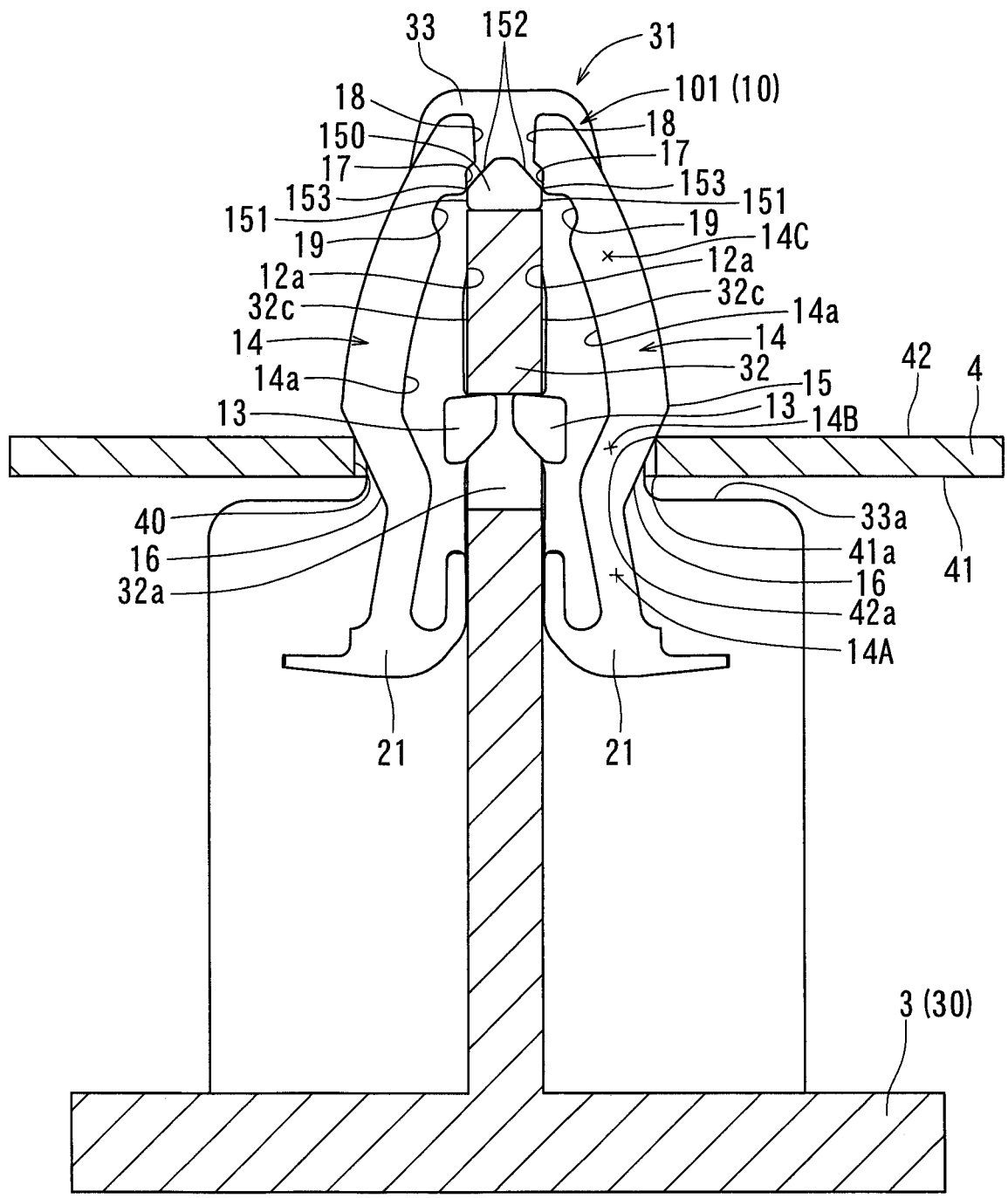
FIG. 12 is an explanatory elevational view of the clip, which illustrate a condition in which an extraction force is applied to a clip main body of the clip shown in FIG. 11.

To the contrary, in order to remove the attaching article 3 from the object member 4, similar to the first embodiment, the attaching article 3 may be simply pulled, so that the clip 101 connected to the object member 4 may be pulled against the retention force of the clip 101. As a result, the outer legs 14 may be elastically bent or flexed inward by the rear surface-side periphery 42*a* of the attaching hole 40 contacting the outer engagement surfaces 16 of the shoulder portions 14B, so that the outer legs 14 are gradually withdrawn from the attaching hole 40 (FIG. 12). At this time, each of the outer legs 14 may be flexed inward with both of the foot portion 21 (the proximal end portion) and the pressing portion 17 (the distal end portion) thereof serving or functioning as double supporting points while the pressing portion 17 slides along one of the bearing surfaces 151 of each of the bearing projections 150 toward one of the tapered end surfaces 152 continuous with the bearing surface 151.

Figure 13:
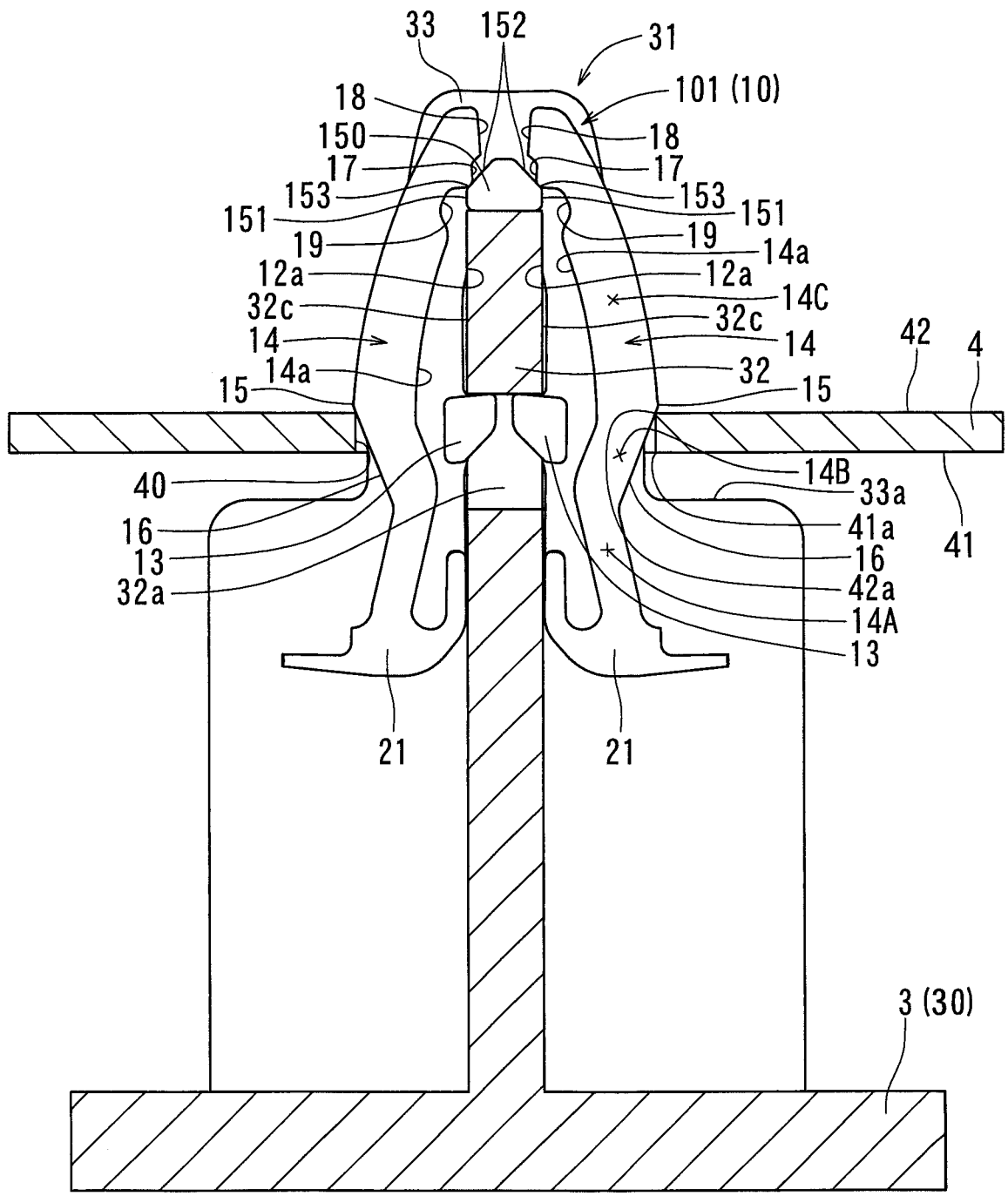
FIG. 13 is an explanatory elevational view of the clip, which illustrate a condition in which the extraction force is further applied to the clip main body of the clip shown in FIG. 12.

Thereafter, when the extraction force is continuously applied to the clip 101, each of the outer legs 14 may be further flexed inward with the foot portion 21 and the pressing portion 17 thereof functioning as the double supporting points. As a result, the pressing portions 17 of the outer legs 14 may respectively be disengaged from the bearing surfaces 151 of the bearing projections 150 before the most-bulged portions 15 of the shoulder portion 14B reach and pass through the rear surface-side periphery 42*a* of the attaching hole 40, so as to be displaced or moved to the tapered end surfaces 152 of the bearing projections 150 (FIG. 13). Therefore, when the extraction force is further applied to the clip 101, similar to the first embodiment, each of the outer legs 14 may be flexed inward with the foot portion 21 thereof serving or functioning as a single supporting point until the most-bulged portion 15 (the outer engagement surface 16) thereof is disengaged from the rear surface-side periphery 42*a* of the attaching hole 40 because the pressing portion 17 thereof may slide along one of the tapered end surfaces 152 of each of the bearing projections 150. This means that the pressing forces (the reaction forces) of the outer legs 14 may be reduced before the most-bulged portions 15 of the shoulder portion 14B reach and pass through the rear surface-side periphery 42*a* of the attaching hole 40, so that the retention force of the clip 1 may be reduced. This means that in this extraction stage, the outer legs 14 may be easily withdrawn from the attaching hole 40 relative to the previous extraction stage.

When the extraction force is further applied to the clip 101 after the most-bulged portions 15 are disengaged from the rear surface-side periphery 42*a* of the attaching hole 40, similar to the first embodiment, the outer legs 14 may be gradually withdrawn from the attaching hole 40 while the curved main portions 14C of the outer legs 14 contact the inner surface of the attaching hole 40. In this extraction stage, each of the outer legs 14 may be flexed or restored outward due to elasticity thereof with the foot portion 21 thereof functioning as the single supporting point while the pressing portion 17 thereof may successively slide along one of the tapered end surfaces 152 of each of the bearing projections 150 toward one of the bearing surfaces 151 continuous with the tapered end surface 152.

Figure 14:
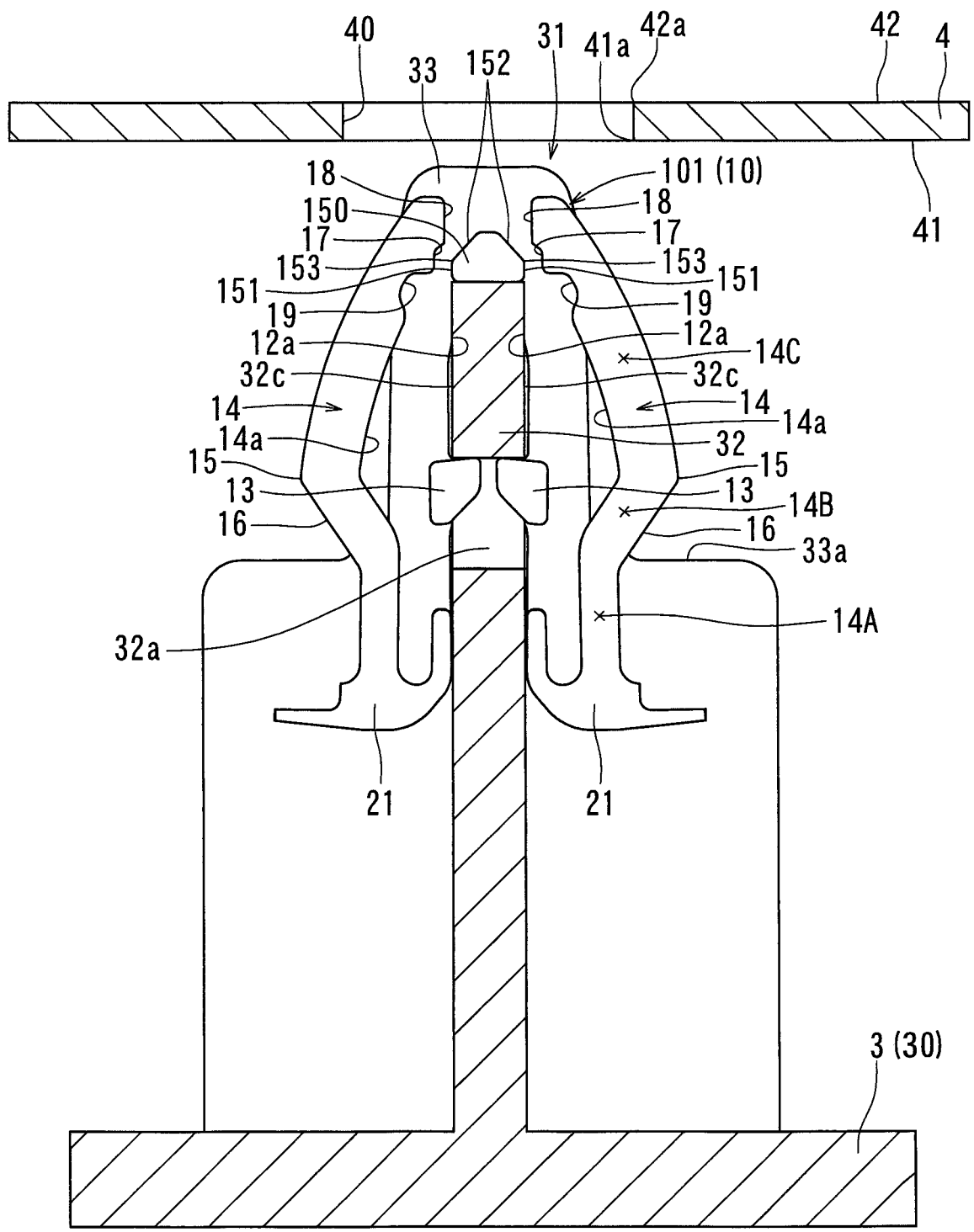
FIG. 14 is an explanatory elevational view of the clip, which illustrate a condition in which the extraction force is applied to the clip main body of the clip shown in FIG. 13.
Figure 15:
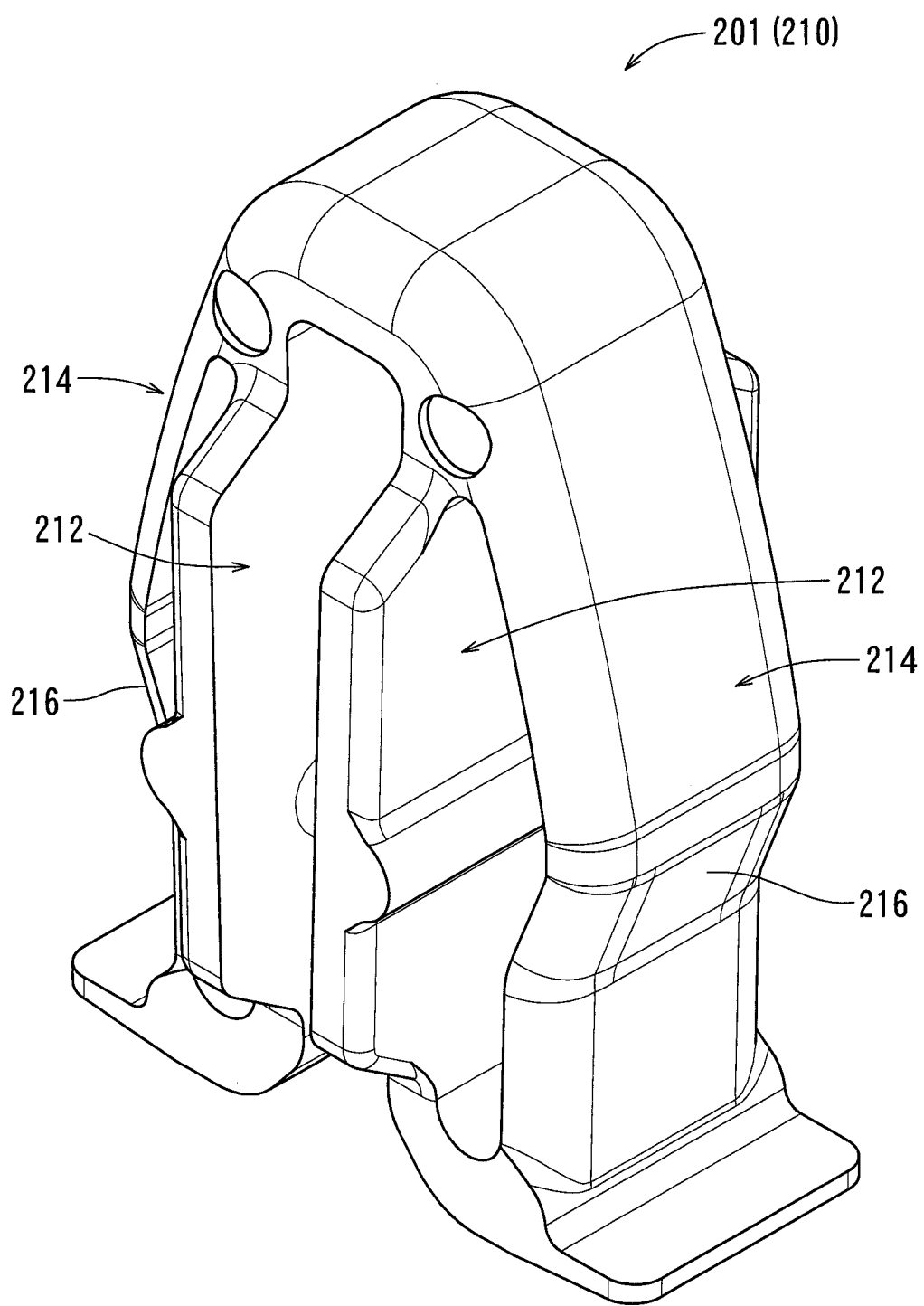
FIG. 15 is an enlarged perspective view of a conventional clip.
Figure 16:
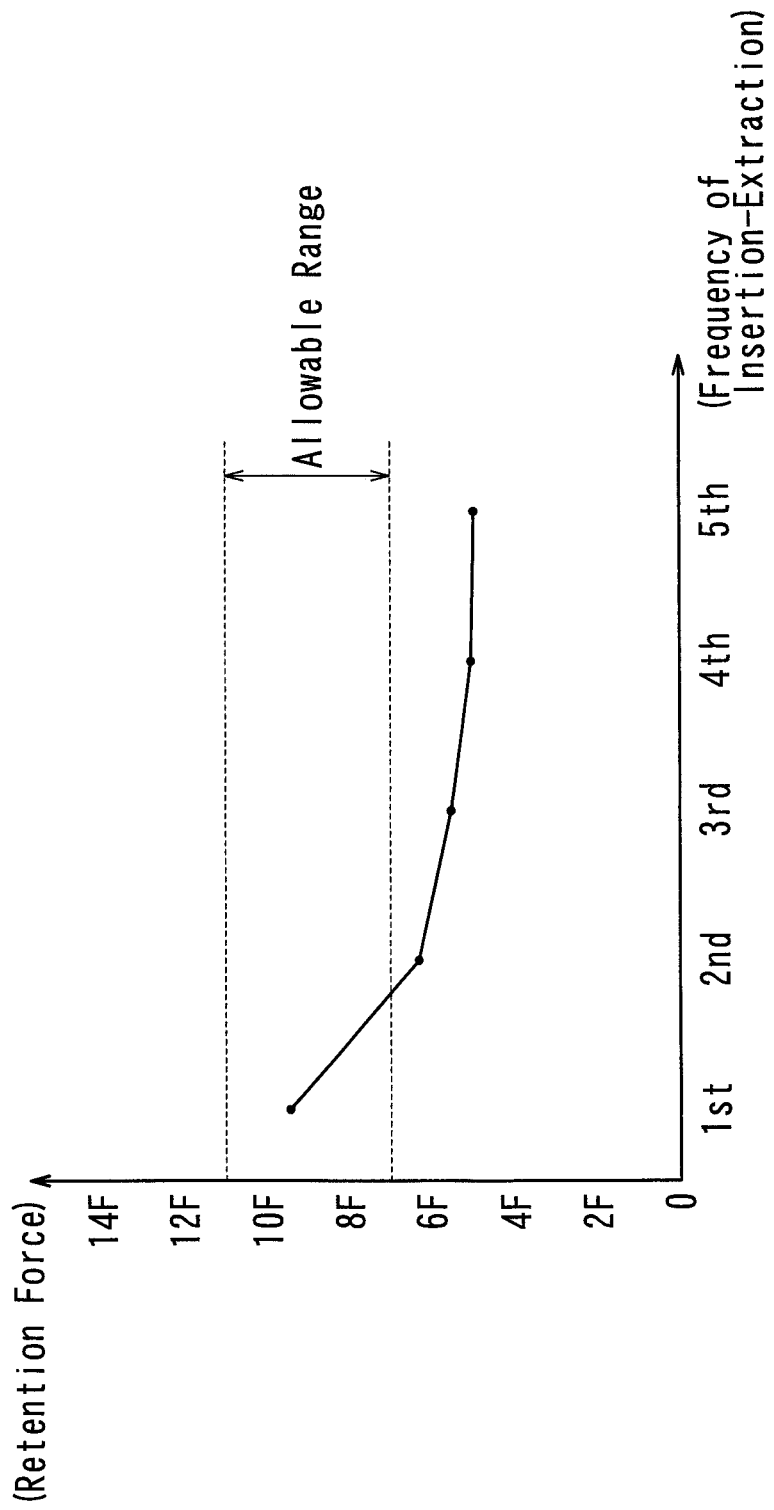
FIG. 16 is a graph illustrating a relationship between an insertion-extraction number of a clip main body and a retention force in the conventional clip.

In this condition, when the clip 1 is pulled, the curved main portions 14C of the outer legs 14 may be gradually spaced from the inner surface of the attaching hole 40, so that the outer legs 14 may be completely withdrawn from the attaching hole 40. Further, at this time, the outer legs 14 may be completely flexed or restored outward such that the pressing portions 17 may be spaced from the bearing surfaces 151 of the bearing projections 150. Thus, the clip 1 may be pulled out from the attaching hole 40, so that the attaching article 3 may be removed from the object member 4 (FIG. 14).

Naturally, various changes and modifications may be made to the present disclosure without departing from the scope of the disclosure. For example, according to the first embodiment, in the attached condition in which the clip 1 connected to the attachment base 31 of the attaching article 3 is inserted into and held in the attaching hole 40 of the object member 4, the pressing portions 17 of the outer legs 14 may respectively be pressed to the bearing surfaces 32*c* of the coupling rib 32 of the attachment base 31. However, in this condition, the pressing portions 17 of the outer legs 14 may respectively be configured to be spaced from the bearing surfaces 32*c* of the coupling rib 32, provided that the pressing portions 17 of the outer legs 14 can respectively be pressed to the bearing surfaces 32*c* of the coupling rib 32 when the extraction force is first applied to the clip 1. The same is true in the second embodiment.

Further, in the first embodiment, the coupling rib 32 has the tapered end surfaces 32*b*. However, the tapered end surfaces 32*b* of the coupling rib 32 can be variously changed in shape. Similarly, in the second embodiment, each of the bearing projections 150 has the tapered end surfaces 152. However, the tapered end surfaces 152 of each of the bearing projections 150 can be variously changed in shape.

Further, in the first embodiment, the taper angle of the tapered end surfaces 32*b* of the coupling rib 32 may be changed as necessary. Similarly, in the second embodiment, the tapered end surfaces 152 of the bearing projections 150 may be changed as necessary. Further, the tapered end surfaces 32*b* of the coupling rib 32 and the tapered end surfaces 152 of the bearing projections 150 may respectively be omitted as necessary.

Representative examples of the present disclosure have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A clip for detachably attaching an attaching article to an object member by inserting a clip main body thereof coupled to a coupling rib of an attachment base formed in the attaching article into an attaching hole formed in the object member, the clip main body comprising:
   a head portion;
   a pair of foot portions;

a pair of inner legs extending from the head portion and respectively connected to the foot portions, the inner legs being configured to engage the coupling rib of the attachment base; and a pair of cantilevered elastically deformable outer legs respectively extending from the foot portions and having distal end portions positioned adjacent to the head portion, the outer legs respectively having pressing portions formed in the distal end portions thereof and having shoulder portions, wherein the outer legs are configured such that in an attached condition in which the clip main body connected to the coupling rib of the attachment base is inserted into and held in the attaching hole of the object member, the pressing portions are respectively pressed to bearing surfaces formed in a bearing member while the shoulder portions respectively engage a rear surface-side periphery of the attaching hole, and wherein the outer legs are configured to be flexed about the foot portion when an extraction force is applied to the clip main body in the attached condition of the clip main body, so that the pressing portions of the outer legs are respectively disengaged from the bearing surfaces of the bearing member before the shoulder portions are disengaged from the rear surface-side periphery of the attaching hole.

2. The clip as defined in claim 1, wherein the outer legs respectively have stopper portions that are respectively formed in the distal end portions thereof so as to be positioned adjacent to distal end peripheries thereof, and wherein the stopper portions are respectively oppositely project inward beyond the pressing portions.

3. The clip as defined in claim 1, wherein the outer legs respectively have depressed portions that are respectively formed in the distal end portions thereof so as to be positioned across the pressing portions from the stopper portions.

4. The clip as defined in claim 1, wherein the bearing member comprises a bearing projection formed in the head portion and positioned between the distal end portions of the outer legs, and wherein the bearing projection having bearing surfaces positioned opposite to the pressing portions of the outer legs.

5. A clip having a clip main body that is configured to be coupled to a coupling rib of an attachment base formed in an attaching article and to be inserted into an attaching hole formed in an object member, the clip main body comprising:

a head portion;

a pair of foot portions;

a pair of inner legs extending from the head portion and respectively connected to the foot portions, the inner legs being configured to engage the coupling rib of the attachment base; and a pair of cantilevered elastically deformable outer legs respectively extending from the foot portions and having distal end portions positioned adjacent to the head portion, the outer legs respectively having pressing portions formed in the distal end portions thereof and having shoulder portions, wherein the outer legs are configured such that pressing portions are respectively pressed to bearing surfaces formed in the coupling rib while the shoulder portions engage a rear surface-side periphery of the attaching hole of the object member in an attached condition in which the clip main body connected to the coupling rib of the attachment base is inserted into and held in the attaching hole of the object member, and wherein the outer legs are configured to be flexed about the foot portions when an extraction force is applied to the clip main body in the attached condition of the clip main body, so that the pressing portions of the outer legs are respectively disengaged from the bearing surfaces of the coupling rib before the shoulder portion are disengaged from the rear surface-side periphery of the attaching hole.

6. The clip as defined in claim 5, wherein the outer legs are configured such that the pressing portions move to release surfaces formed in a distal end portion of the coupling rib after the pressing portions are disengaged from the bearing surfaces of the coupling rib.

* * * * *